United States Patent
Busen et al.

(10) Patent No.: US 6,626,163 B1
(45) Date of Patent: Sep. 30, 2003

(54) OIL SEPARATOR FOR DE-OILING CRANKCASE VENTILATION GASES OF AN INTERNAL COMBUSTION ENGINE

(75) Inventors: Jürgen Busen, Ahaus (DE); Sieghard Pietschner, Greven (DE)

(73) Assignee: Walter Hengst GmbH & Co. KG, Muenster (DE)

( * ) Notice: Subject to any disclaimer, the term of this patent is extended or adjusted under 35 U.S.C. 154(b) by 0 days.

(21) Appl. No.: 09/720,449

(22) PCT Filed: May 3, 2000

(86) PCT No.: PCT/EP00/03940
§ 371 (c)(1),
(2), (4) Date: Feb. 23, 2001

(87) PCT Pub. No.: WO00/68548
PCT Pub. Date: Nov. 16, 2000

(30) Foreign Application Priority Data

Jun. 5, 1999 (DE) .................... 299 08 116 U

(51) Int. Cl.⁷ ............................................. F01M 13/04
(52) U.S. Cl. ........................................ 123/572; 123/573
(58) Field of Search ................ 123/572, 573, 123/574

(56) References Cited

U.S. PATENT DOCUMENTS

| | | | | |
|---|---|---|---|---|
| 5,080,082 A | * | 1/1992 | Mueller et al. | 123/572 |
| 5,239,972 A | * | 8/1993 | Takeyama et al. | 123/573 |
| 5,460,147 A | * | 10/1995 | Bohl | 123/572 |
| 5,617,834 A | * | 4/1997 | Lohr | 123/572 |
| 5,944,001 A | * | 8/1999 | Hutchins | 123/572 |
| 6,279,556 B1 | * | 8/2001 | Busen et al. | 123/572 |

* cited by examiner

*Primary Examiner*—Marguerite McMahon

(57) ABSTRACT

The invention relates to an oil separator for de-oiling crankcase ventilation gases of an internal combustion engine wherein the oil separator (1) comprises at least one cyclone encompassing a gas inlet connected to the crankcase of the internal combustion engine, a gas outlet connected to the air suction passage of the internal combustion engine, and an oil outlet connected to the crankcase sump of the internal combustion engine wherein the gas outlet, as a submerged pipe projects through a lid into the cyclone interior with the lid closing the cyclone at the top.

The novel oil separator has a gas duct section which is provided above the gas outlet on top of the lid with the gas duct section comprising a cross-section horizontally enlarged to at least double size, and an oil drain passage is guided from this section downwards to the oil outlet or the crankcase sump.

11 Claims, 2 Drawing Sheets

OIL SEPARATOR FOR DE-OILING CRANKCASE VENTILATION GASES OF AN INTERNAL COMBUSTION ENGINE

BACKGROUND OF THE INVENTION

The present invention relates to an oil separator for de-oiling crankcase ventilation gases of an internal combustion engine wherein the oil separator comprises at least one cyclone encompassing a gas inlet connected to the crankcase of the internal combustion engine, a gas outlet connected to the air suction passage of the internal combustion engine, and an oil outlet connected to the crankcase sump of the internal combustion engine, wherein the gas outlet, as a submerged pipe, projects through a lid into the cyclone interior with the lid closing the cyclone at the top.

An oil separator of the kind mentioned above, e.g., is known from the DE 42 14 324 C2. The submerged pipe serving as a gas outlet in this oil separator is continued as a gas pipe above the lid closing the cyclone on top, with the gas pipe being extended to the air suction passage of the internal combustion engine. It is considered to be a disadvantage of this known oil separator that during operation remaining oil particles are carried in the direction of the gas outlet which leads to an thick oil deposit at the inner surface of the gas outlet. When a certain thickness of this oil deposit is reached, and when sufficiently large gas flow velocities occur, some of this oil may again enter the clean gas flow. The oil particles carried by the clean gas flow necessarily enter the air suction passage of the internal combustion engine which is non-desired as hereby the mix ratio for the internal combustion engine is influenced in a negative manner.

SUMMARY OF INVENTION

Therefore it is an object of the present invention to provide an oil separator of the kind mentioned above which avoids the disadvantages mentioned and whereby it is ensured that no additional oil particles can be carried by the clean gas flow.

According to the invention this object is attained by an oil separator of the kind mentioned above which is characterized in that a gas duct section is provided above the gas outlet on top of the lid with the gas duct section comprising a cross-section enlarged to at least double size, and that an oil drain passage is guided from this section downwards to the oil outlet or the crankcase sump.

With the design of the oil separator according to the invention oil droplets which are eventually present in the gas flowing from the cyclone through the gas outlet, are precipitated in the area of the gas pipe section which is enlarged in the diameter thereof and cling to the surfaces thereof, and flow to the oil drain passage under the influence of gravity, with the oil being guided either directly to the crankcase sump of the internal combustion engine or firstly to the oil drain and from there together with the oil separated in the cyclone to the crankcase sump of the internal combustion engine. In this manner the oil separation rate is particularly high, and neither oil mist nor occasionally larger oil drops get into the air suction passage of the internal combustion engine. This has a positive effect on the exhaust values of the internal combustion engine, and minimizes the oil consumption of the internal combustion engine such that the oil has to be less.

In order to avoid a non-desired gas flow from bottom to the top through the oil drain passage, it is provided that the lower end of the oil drain passage is designed with a siphon or a check valve.

In a further embodiment of the oil separator it is provided that the submerged pipe ends shortly above the lid, that the oil drain passage begins from the top side of the lid, and that for forming the gas duct section, a bell-shaped or hopper-shaped hood is arranged above the lid with the hood comprising a diameter at its bottom which at least equals that of the lid, with the hood having a narrower open end on top which is designed as a connection piece to be connected to the suction passage of the internal combustion engine. With this embodiment of the oil separator on the one hand the desired function is attained, and on the other hand a simple construction which enables a construction of the oil separator from relatively few and non-complicated parts.

In order to guarantee a dedicated and effective oil drain from the area on top of the lid, it is provided that an annular indentation extends around the lid, or that the lid comprises an indentation and/or a slope at its top, and that the oil drain passage begins in the indentation or at the lowest point of the slope. By this means the oil is collected and drained, wherein it is guaranteed that it will not get into the area of high gas flow velocities where it may be carried away by the flowing gas.

Regarding the submerged pipe it is preferably provided that the submerged pipe is designed with a cross-section which is enlarged in the gas flow direction, and is preferably conical. On the one hand, by this design a high oil separation rate of the cyclone is attained, and on the other hand, a reduction of the gas flow velocity at the upper end of the submerged pipe occurs which is favorable for the separation of remaining oil above the submerged pipe in the gas pipe section with the enlarged cross-section.

Further, it is preferably provided that the oil outlet is designed with an oil collection hopper arranged below the cyclone, and that the lower end of the oil drain passage opens into the oil collection hopper. By this means, in a simple way, a collection of the two oil streams from the oil outlet positioned at the lower end of the cyclone, and of the oil drain passage in the vicinity thereof, is attained. The further return flow up to the crankcase sump of the internal combustion engine is then attained by a common and single oil pipe.

The oil separator according to the DE 42 14 324 C2 mentioned above comprises a single cyclone for separating the oil from the crankcase ventilation gas. Deviating from this construction it may be prudent for improving the efficiency of the oil separator, in different and fluctuating working conditions of the internal combustion engine, to design the oil separator with two or more cyclones. For such an embodiment the present invention preferably provides that the hood overlaps the lids and the submerged pipes of all cyclones, and that a single oil drain passage is provided. In this manner a compact design, with few and relatively simply shaped single parts of the oil separator, is attained, keeping the manufacturing and assembly costs low.

BRIEF DESCRIPTION OF THE DRAWINGS

Two embodiments of the invention subsequently are explained referring to a drawing. The Figures of the drawing illustrate.

DETAILED DESCRIPTION OF THE PREFERRED EMBODIMENTS

Figure 1:
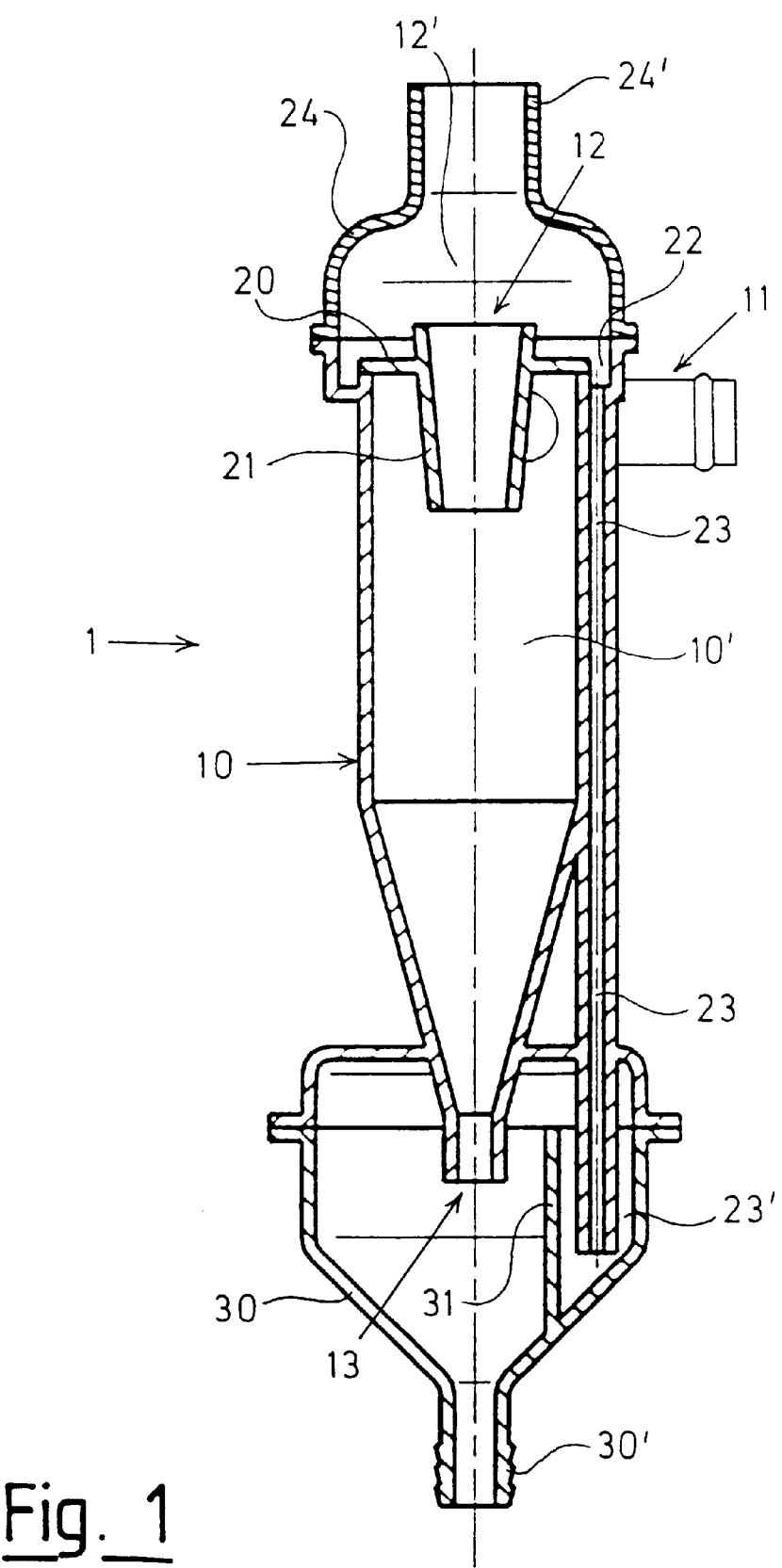
FIG. 1 shows an oil separator with a cyclone in a vertical section.

In the embodiment illustrated in FIG. 1, an oil separator 1 is shown with a single cyclone 10. As it is known and usual, the cyclone 10 comprises a cylindrical housing in its upper part which becomes narrower downwards like a hopper. At the upper end of the cyclone 10 a gas inlet 11 opens tangentially into the interior 10' of the cyclone 10. The cyclone 10 is closed by a lid 20 at the top into which a submerged pipe 21, as a gas outlet 12, is inserted. In operation of the oil separator 1, crankcase ventilation gas of an internal combustion engine flows through the gas inlet 11 into the interior 10' of the cyclone 10, and is rotated into a helical flow, in which the carried oil droplets are carried outwards by centrifugal forces, and will precipitate at the inner side of the cyclone 10. The gas flow relieved from the oil droplets to a high degree is deviated upwards at the lower end of the submerged pipe 21, and will flow upwards through the submerged pipe 21 serving as the gas outlet 12.

The submerged pipe 21 ends shortly above the upper side of the lid 20 where a gas pipe section 12' with a enlarged horizontal cross-section is connected. This gas pipe section 12' is formed by a hood 24 whose lower edge is connected in a gas tight manner with a projection provided at the upper end of the cyclone 10. Upwards, the hood 24 is narrowed, on the form of a bell and ends in a connection end 24' which serves for connection to a continued gas pipe leading to the air suction passage of the associated internal combustion engine.

By the enlargement of the cross-section in the area of the gas pipe section 12; oil droplets present in the gas flow leaving the gas outlet 12 will precipitate at the inner side of the hood 24, and will flow downwards along the inner side, after having reached a larger oil layer thickness, under the influence of gravity. For collecting the downwards flowing oil, an annular indentation 22 encircling the lid 20 is provided at the upper side at the cyclone 10. From the right side, in the drawing of the indentation 22, an oil drain passage 23 leads downwards to the vicinity of the oil outlet 13 of the cyclone 10.

The oil outlet 13 at the lower end of the cyclone 10, and the lower end of the oil drain passage 23, commonly are guided into a closed oil collection hopper 30. The lower end 30' thereof is designed as a connection for a continuing oil pipe which guides the oil collected in the oil collection hopper 30 from the cyclone 10 and from the oil drain passage 23 in common to the crankcase sump of the internal combustion engine.

In order to avoid an un-desired gas flow from bottom to top through the oil drain passage 23, the lower end thereof is designed in the form of a siphon 23'. In the embodiment of the oil separator 1 according to FIG. 1 a separating wall 31 is provided for this reason in the oil collection hopper 30, with the separating wall, at the upper edge thereof, enabling a transfer of oil from the oil drain passage 23 into the remaining part of the oil collection hopper 30, and which at the same time with its upper edge, is positioned above the lower end of the oil drain passage 23.

Figure 2:
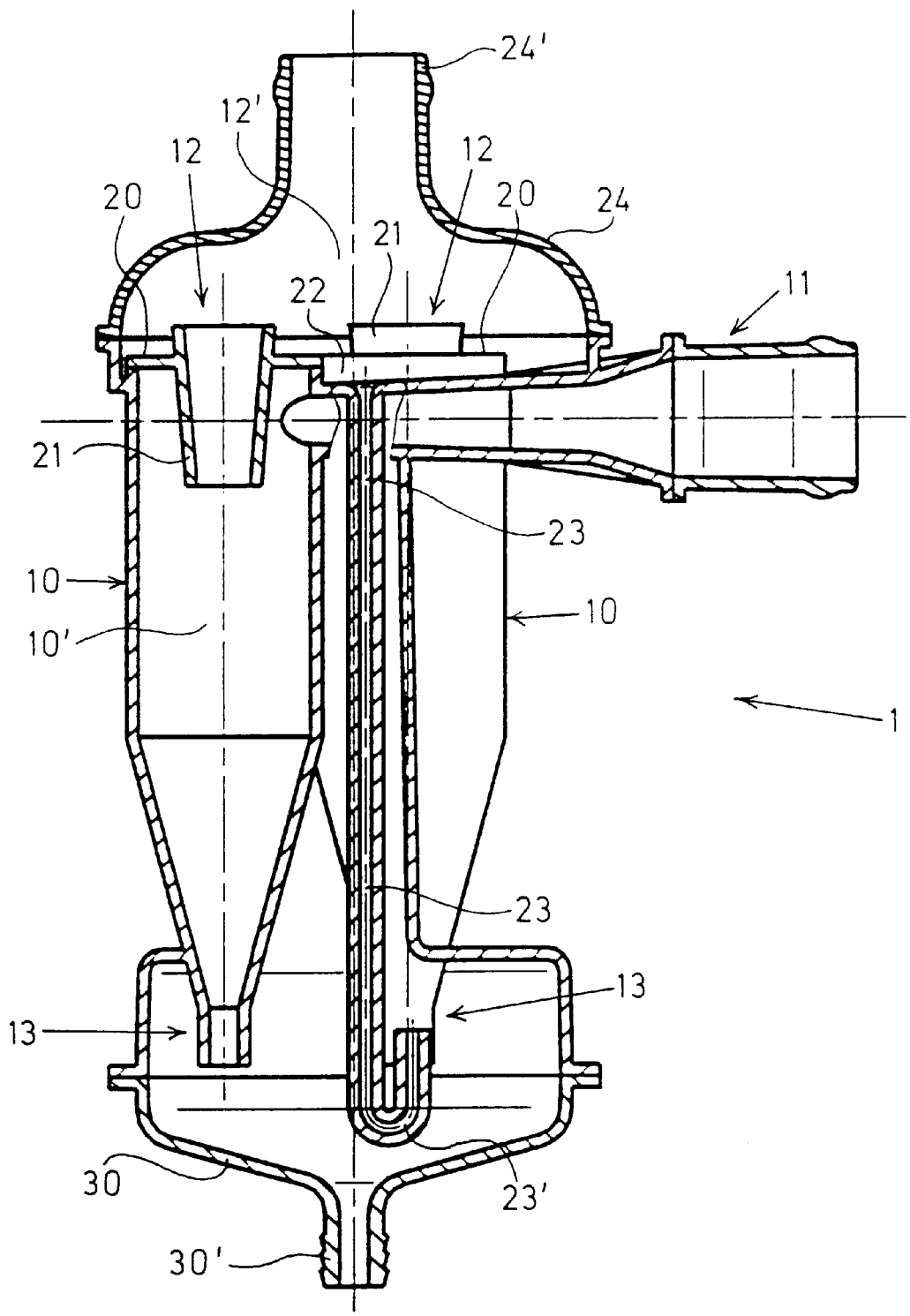
FIG. 2 an oil separator with several cyclones also in a vertical section.

In FIG. 2, an embodiment of an oil separator 1 is illustrated with several cyclones 10, in this case with three cyclones. Because of the illustration of the oil separator 1 in a vertical section, at the right side in the background, the first cyclone 10 is visible in a elevational view, whereas at the left side the second cyclone 10 is visible in a section. The third cyclone 10 is positioned within the contour of the first cyclone 10 above the section plane of the drawing and therefore is not visible.

The single cyclones 10, in the form and function thereof, are designed in correspondence with the embodiment according FIG. 1. Therein a common gas inlet 11 branches to the single cyclones 10. Furthermore, each single cyclone 10 comprises a lid 20 on top with an inserted submerged pipe 21 as the gas outlet 12.

Furthermore, the oil separator 1 according to FIG. 2 comprises a hood 24 which overlaps the lids 20 and the submerged pipes 21 of all three cyclones 10. The oil precipitated at the inner side of the hood 24 under the influence of gravity will flow downwards to the upper side of the lids 20 and from there into a centrally positioned indentation 22. From this indentation 22 an oil drain passage 23 leads downwards into the vicinity of the oil outlets 13 of the cyclones 10.

A common oil collection hopper 30 for all cyclones 10 is positioned at the lower end of the oil separator 1, with the lower end of the oil drain passage 23 opening into the oil collection hopper 30. To avoid a gas flow in the opposite direction of the oil flow in the oil drain passage 23, the oil drain passage is designed at the lower end thereof with a U-shaped, upwards bent section for forming a siphon 23'. The lower end 30' of the oil collection hopper 30, also in this case, is designed as a connection to an oil pipe leading to the crankcase sump of the internal combustion engine.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

What is claimed is:

1. An oil separator for de-oiling crankcase ventilation gases of an internal combustion engine wherein the oil separator comprises at least one cyclone having a gas inlet for connection to a crankcase of the internal combustion engine, a gas outlet for connection to an air suction passage of the internal combustion engine, and an oil outlet for connection to a crankcase sump of the internal combustion engine, the gas outlet, in the form of a submerged pipe, projecting through a lid into an interior of the cyclone with the lid closing the cyclone at a top, a gas duct section provided above the gas outlet on top of the lid, with the gas duct section comprising a horizontal cross-section enlarged to at least double size as compared to the gas outlet, and a separate oil drain passage guided from the gas duct section downwards to at least one of the oil outlet and the crankcase sump.

2. An oil separator according to claim 1, wherein a lower end of the oil drain passage is provided with one of a siphon and a check valve.

3. An oil separator according to claim 1, wherein the submerged pipe projects slightly above the lid, the oil drain passage for forming the gas duct section comprises a hood which is arranged above the lid, with the hood comprising a diameter at its bottom which at least equals that of the lid, and with the hood having a narrower open end at a top end which forms a connection piece for connection to the suction passage of the internal combustion engine.

4. An oil separator according to claim 1, wherein an annular indentation extends around the lid and the oil drain passage begins in the indentation.

5. An oil separator according to claim 1, wherein the lid comprises an indentation and the oil drain passage begins in the indentation.

6. An oil separator according to claim 1, wherein the lip comprises a slope at its peripheral edge and the oil drain passage begins at a lowest point of the slope.

7. An oil separator according to claim 1, wherein the submerged pipe has a cross-section which expands in a gas flow direction.

8. An oil separator according to claim 7, wherein the submerged pipe has a conical shape.

9. An oil separator according to claim 1, wherein the oil outlet includes an oil collection hopper arranged below the cyclone, and a lower end of the oil drain passage opens into the oil collection hopper.

10. An oil separator according to claim 3, wherein the separator comprises a plurality of the cyclones and the hood overlaps the lids and the submerged pipes of all of the cyclones, and a single oil drain passage is provided.

11. An oil separator for de-oiling crankcase ventilation gases of an internal combustion engine, said oil separator comprising:

at least one cyclone having a cylindrical body forming said cyclone, a gas inlet tangentially arranged at said body, a lid above said gas inlet forming a top end of said body;

a gas outlet extending through said lid at said top end of said body, an oil outlet at a bottom end of said body, a gas duct section positioned above said gas outlet and said lid, said gas duct section comprising a horizontal cross-section at least double in size as compared to a horizontal cross-section of said gas outlet, and a separate oil drain passage extending from said gas duct section downwards to said bottom and of said housing.

* * * * *